United States Patent
Lee et al.

(10) Patent No.: US 10,608,947 B2
(45) Date of Patent: Mar. 31, 2020

(54) PER-FLOW JUMBO MTU IN NR SYSTEMS

(71) Applicant: QUALCOMM Incorporated, San Diego, CA (US)

(72) Inventors: Kuo-Chun Lee, San Diego, CA (US); Srinivasan Balasubramanian, San Diego, CA (US); Arvind Vardarajan Santhanam, San Diego, CA (US); Reza Shahidi, San Diego, CA (US); Suli Zhao, San Diego, CA (US); Arnaud Meylan, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/905,139

(22) Filed: Feb. 26, 2018

(65) Prior Publication Data

US 2019/0268276 A1    Aug. 29, 2019

(51) Int. Cl.
*H04L 12/805* (2013.01)
*H04L 12/26* (2006.01)
*H04W 72/04* (2009.01)
*H04W 76/10* (2018.01)

(52) U.S. Cl.
CPC .............. *H04L 47/36* (2013.01); *H04L 43/10* (2013.01); *H04W 72/04* (2013.01); *H04W 76/10* (2018.02)

(58) Field of Classification Search
CPC . G06F 9/45558; G06F 9/5077; H04L 43/026; H04L 43/0888; H04L 43/16; H04L 47/2441; H04L 47/365; G05B 19/4185; G05B 19/41855; G05B 2219/31115; G05B 2219/31329
See application file for complete search history.

(56) References Cited

U.S. PATENT DOCUMENTS

| | | | |
|---|---|---|---|
| 7,738,495 B2 | 6/2010 | Dalal et al. | |
| 9,237,110 B2 | 1/2016 | Decusatis et al. | |
| 9,271,164 B2 | 2/2016 | Cheng | |
| 9,787,596 B2 | 10/2017 | Huang-Fu et al. | |
| 2012/0051236 A1 | 3/2012 | Hegde et al. | |
| 2012/0281559 A1* | 11/2012 | Ner | H04W 28/06 370/252 |
| 2013/0176854 A1 | 7/2013 | Chisu et al. | |
| 2014/0376427 A1 | 12/2014 | Hui et al. | |
| 2016/0218962 A1* | 7/2016 | Huang-Fu | H04L 29/08 |

OTHER PUBLICATIONS

International Search Report and Written Opinion—PCT/US2019/019418—ISA/EPO—dated Apr. 12, 2019.

* cited by examiner

*Primary Examiner* — Yemane Mesfin
*Assistant Examiner* — Mon Cheri S Davenport
(74) *Attorney, Agent, or Firm* — Patterson & Sheridan, LLP

(57) ABSTRACT

Certain aspects of the present disclosure provide techniques for per-flow jumbo maximum transmission unit (MTU) in new radio (NR) systems. A method of wireless communication by a user equipment (UE) is provided. The method generally includes determining a default MTU size to be used for communications in a packet data network (PDN). The method includes determining one or more per-flow MTU sizes, different than the default MTU size, to be used for communications in the PDN. The method includes communicating in the PDN according to the determined per-flow MTU sizes.

25 Claims, 17 Drawing Sheets

PER-FLOW JUMBO MTU IN NR SYSTEMS

BACKGROUND

Field of the Disclosure

Aspects of the present disclosure relate generally to wireless communications systems and, more particularly, to a per-flow jumbo maximum transmission unit (MTU) in new radio (NR) systems, such as in 5G.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more BSs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for per-flow jumbo maximum transmission unit (MTU) in new radio (NR) systems, such as 5G.

Certain aspects of the present disclosure provide a method for wireless communication that may be performed, for example, by a user equipment (UE). The method generally includes determining a default MTU size to be used for communications in a packet data network (PDN). The method includes determining one or more per-flow MTU sizes, different than the default MTU size, to be used for communications in the PDN. The method includes communicating in the PDN according to the determined per-flow MTU sizes.

Certain aspects of the present disclosure provide a method for wireless communication that may be performed, for example, by a base station (BS). The method generally includes configuring a UE with a default MTU size to be used for communications in a PDN. The method includes indicating one or more per-flow MTU sizes, different than the default MTU size, to be used by the UE for communications in the PDN. The method includes communicating in the PDN according to the determined per-flow MTU sizes.

Certain aspects of the present disclosure provide a method for wireless communication that may be performed, for example, by a network entity. The method generally includes determining a default MTU size to be used for communications in a PDN. The method includes providing an indication to another network entity of one or more per-flow MTU sizes, different than the default MTU size, to be used for communications in the PDN.

Certain aspects of the present disclosure provide an apparatus for wireless communication, such as a UE. The apparatus generally includes means for determining a default MTU size to be used for communications in a PDN. The apparatus includes means for determining one or more per-flow MTU sizes, different than the default MTU size, to be used for communications in the PDN. The apparatus includes means for communicating in the PDN according to the determined per-flow MTU sizes.

Certain aspects of the present disclosure provide an apparatus for wireless communication such as a BS. The apparatus generally includes means for configuring a UE with a default MTU size to be used for communications in a PDN. The apparatus includes means for indicating one or more per-flow MTU sizes, different than the default MTU size, to be used by the UE for communications in the PDN. The apparatus includes means for communicating in the PDN according to the determined per-flow MTU sizes.

Certain aspects of the present disclosure provide an apparatus for wireless communication such as a network entity. The apparatus generally includes means for determining a default MTU size to be used for communications in a PDN. The apparatus includes means for providing an indication to another network entity of one or more per-flow MTU sizes, different than the default MTU size, to be used for communications in the PDN.

Certain aspects of the present disclosure provide an apparatus for wireless communication such as a UE. The apparatus generally includes at least one processor coupled with a memory and configured to determine a default MTU size to be used for communications in a PDN. The at least one processor is configured to determine one or more per-flow MTU sizes, different than the default MTU size, to be used for communications in the PDN. The apparatus includes a transceiver configured to communicate in the PDN according to the determined per-flow MTU sizes.

Certain aspects of the present disclosure provide an apparatus for wireless communication such as a BS. The apparatus generally includes at least one processor coupled with a memory and configured to configure a UE with a default MTU size to be used for communications in a PDN. The at least one process to configured to indicate one or more per-flow MTU sizes, different than the default MTU size, to be used by the UE for communications in the PDN. The apparatus includes a transceiver configured to communicate in the PDN according to the determined per-flow MTU sizes.

Certain aspects of the present disclosure provide an apparatus for wireless communication such as a network entity. The apparatus generally includes at least one processor coupled with a memory and configured to determine a default MTU size to be used for communications in a PDN. The apparatus includes a transmitter configured to provide an indication to another network entity of one or more per-flow MTU sizes, different than the default MTU size, to be used for communications in the PDN.

Certain aspects of the present disclosure provide a computer readable medium having computer executable code stored thereon for wireless communication by a UE. The computer executable code generally includes code for determining a default MTU size to be used for communications in a PDN. The computer executable code generally includes code for determining one or more per-flow MTU sizes, different than the default MTU size, to be used for communications in the PDN. The computer executable code generally includes code for communicating in the PDN according to the determined per-flow MTU sizes.

Certain aspects of the present disclosure provide a computer readable medium having computer executable code stored thereon for wireless communication by a BS. The computer executable code generally includes code for configuring a UE with a default MTU size to be used for communications in a PDN. The computer executable code generally includes code for indicating one or more per-flow MTU sizes, different than the default MTU size, to be used by the UE for communications in the PDN. The computer executable code generally includes code for communicating in the PDN according to the determined per-flow MTU sizes.

Certain aspects of the present disclosure provide a computer readable medium having computer executable code stored thereon for wireless communication by a network entity. The computer executable code generally includes code for determining a default MTU size to be used for communications in a PDN. The computer executable code generally includes code for providing an indication to another network entity of one or more per-flow MTU sizes, different than the default MTU size, to be used for communications in the PDN.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
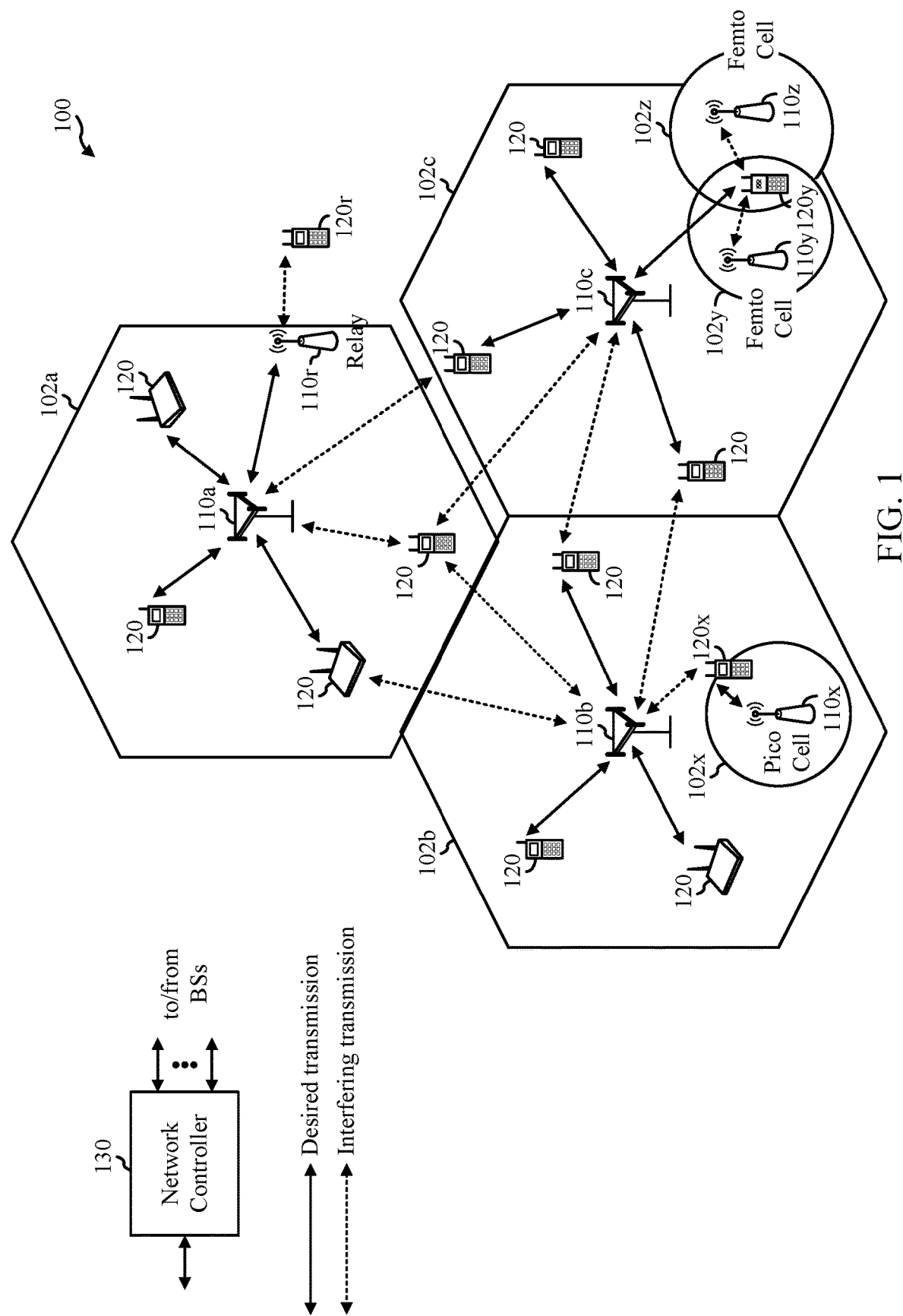
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Maximum transmission unit (MTU) is largest supported transaction size. For example, the MTU may be largest packet size that can be transmitted/received in a network. If a transmission exceeds the MTU, then the transmission may be fragmented or dropped. Different networks and different devices may support different MTU sizes. For example, NR may support a large MTU, referred to herein as a "jumbo MTU".

Aspects of the present disclosure provide techniques and apparatus for MTU handling in NR. In some cases, while a default MTU size can be configured for the network, the MTU size at the UE, for uplink or downlink, may be determined per-flow. Thus, the MTU size at can be based on a smallest supported within the network and by a destination device for the flow. In some cases, a network entity can act as a proxy for the UE for MTU discovery to determine the uplink and/or downlink MTU size associated with the destination device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 can be configured with a default maximum transmission unit (MTU) size for a packet data network (PDN) connection with the wireless network 100. A BS 110 may configure the UE with the default MTU size. The UE 120 then determines one or more per-flow MTU sizes, different than the default MTU sizes, to be used communicating on a flow in the network. The BS 110 may indicate/signal the one or more per-flow MTU sizes to the UE 120. A network entity in the wireless network 100 can act as a proxy for determining the MTU size supported by a destination device for a flow and/or determining the per-flow MTU size. The network entity may indicate the per-flow MTU sizes to another network entity.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2A:
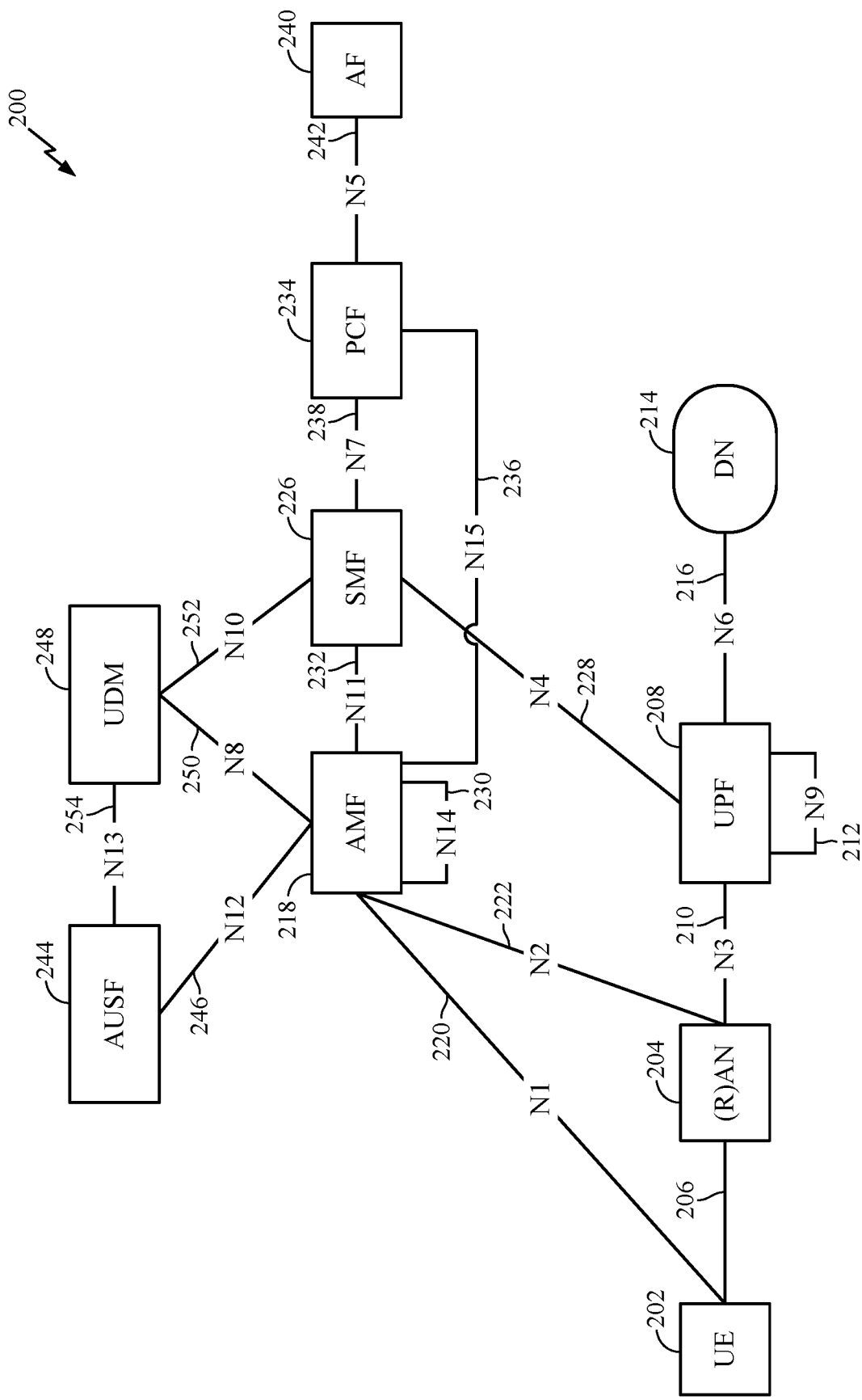
FIGS. 2A-2D are block diagrams illustrating example logical architectures of radio access networks (RANs), in accordance with certain aspects of the present disclosure.

FIG. 2A illustrates an example logical architecture 200 of a NR radio access network (RAN), which may be implemented in the wireless network 100 illustrated in FIG. 1. A UE 202 may access a RAN 204 via an NR air interface 206. The RAN may communicate with a user plane function (UPF) 208 via an N3 interface 210. Communications between different UPFs 208 may be conveyed via an N9 interface 212. The UPFs 208 may communicate with a data network (DN) (e.g., the Internet, network-operator-provided services) 214 via one or more N6 interfaces 216. The UE 202 may communicate with one or more core access and mobility management functions (AMFs) 218 via an N1 interface 220. The RAN may communicate with the one or more AMFs via an N2 interface 222. The UPFs 208 may communicate with a session management function (SMF) 226 via an N4 interface 228.

Communications between different AMFs 218 may be conveyed via an N14 interface 230. The AMFs 218 may communicate with the SMF 226 via an N11 interface 232. The AMFs 218 may communicate with a policy control function (PCF) 234 via an N15 interface 236. The SMF 226 may communicate with the PCF 234 via an N7 interface 238. The PCF 234 may communicate with an application function (AF) 240 via an N5 interface 242. The AMFs 218 may communicate with an authentication server function (AUSF) 244 via an N12 interface 246. The AMFs 218 may communicate with a unified data management (UDM) 248 via an N8 interface 250. The SMF 226 may communicate with the UDM 248 via an N10 interface 252. The AUSF 244 may communicate with the UDM 248 via an N13 interface 254.

While the example logical architecture 200 illustrates a single UE, the present disclosure is not so limited, and the architecture may accommodate any number of UEs. Similarly, the architecture shows the UE 202 accessing a single DN 214, but the present disclosure is not so limited, and the architecture accommodates a UE communicating with a plurality of DNs, as described below with reference to FIG. 2B.

Figure 2B:
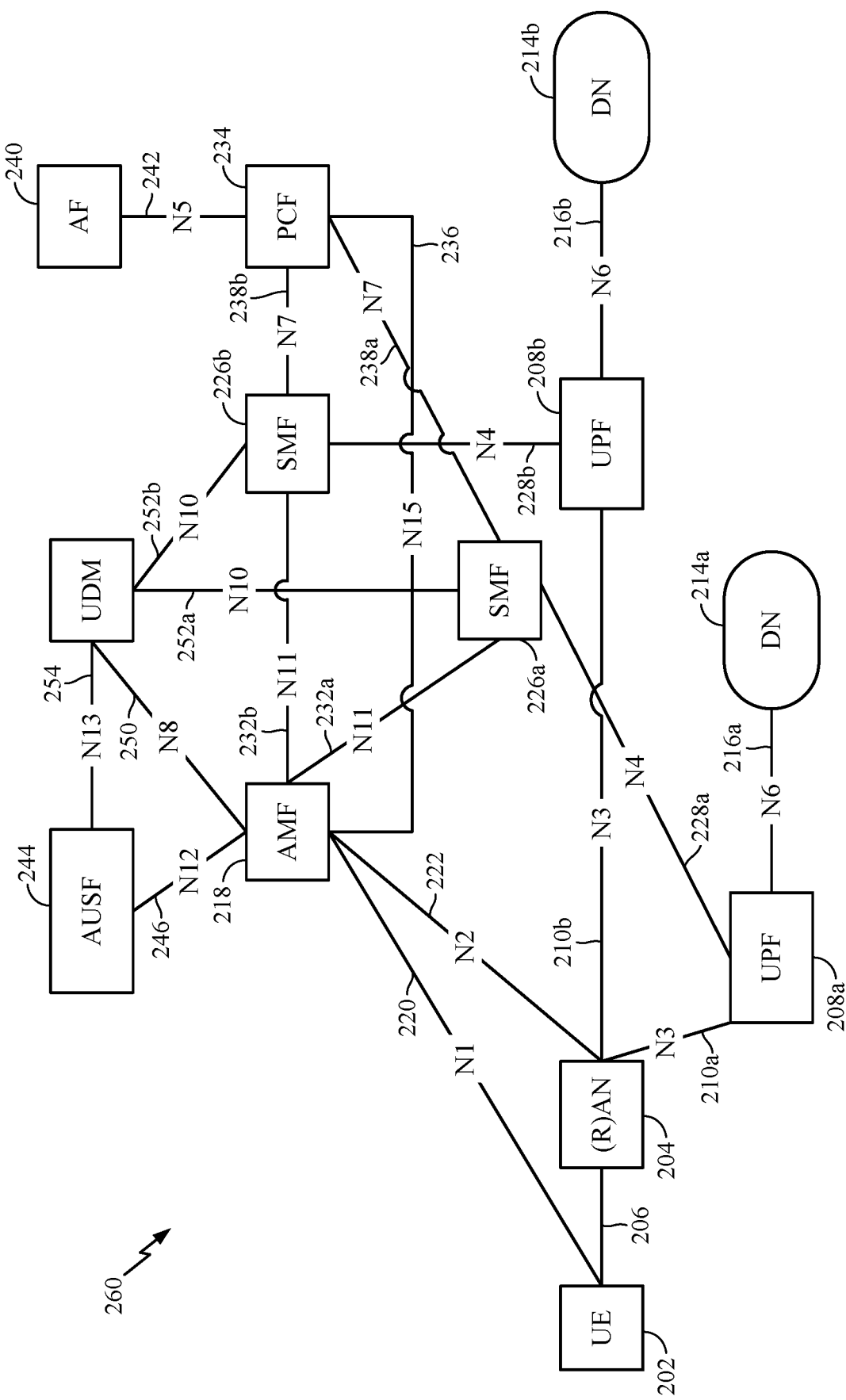

FIG. 2B illustrates an example logical architecture 260 of a NR RAN, which may be implemented in the wireless network 100 illustrated in FIG. 1. The logical architecture 250 is similar to the logical architecture 200 shown in FIG. 2A, with many of the same entities shown and labeled with the same labels. Thus, only differences from FIG. 2A will be described. The UE 202 in FIG. 2B is accessing two DNs, 214a and 214b, via the RAN 204. The RAN 204 communicates with a first UPF 208a via a first N3 interface 210a. The RAN 204 also communicates with a second UPF 208b via a second N3 interface 210b. Each UPF 208b communicates with a corresponding DN 214a or 214b via a corresponding N6 interface 216a or 216b. Similarly, each UPF communicates with a corresponding SMF 226a or 226b via a corresponding N4 interface 228a or 228b. Each SMF communicates with the AMF 218 via a corresponding N11 interface 232a or 232b. Similarly, each SMF communicates with the PCF via a corresponding N7 interface 238a or 238b.

Figure 2C:
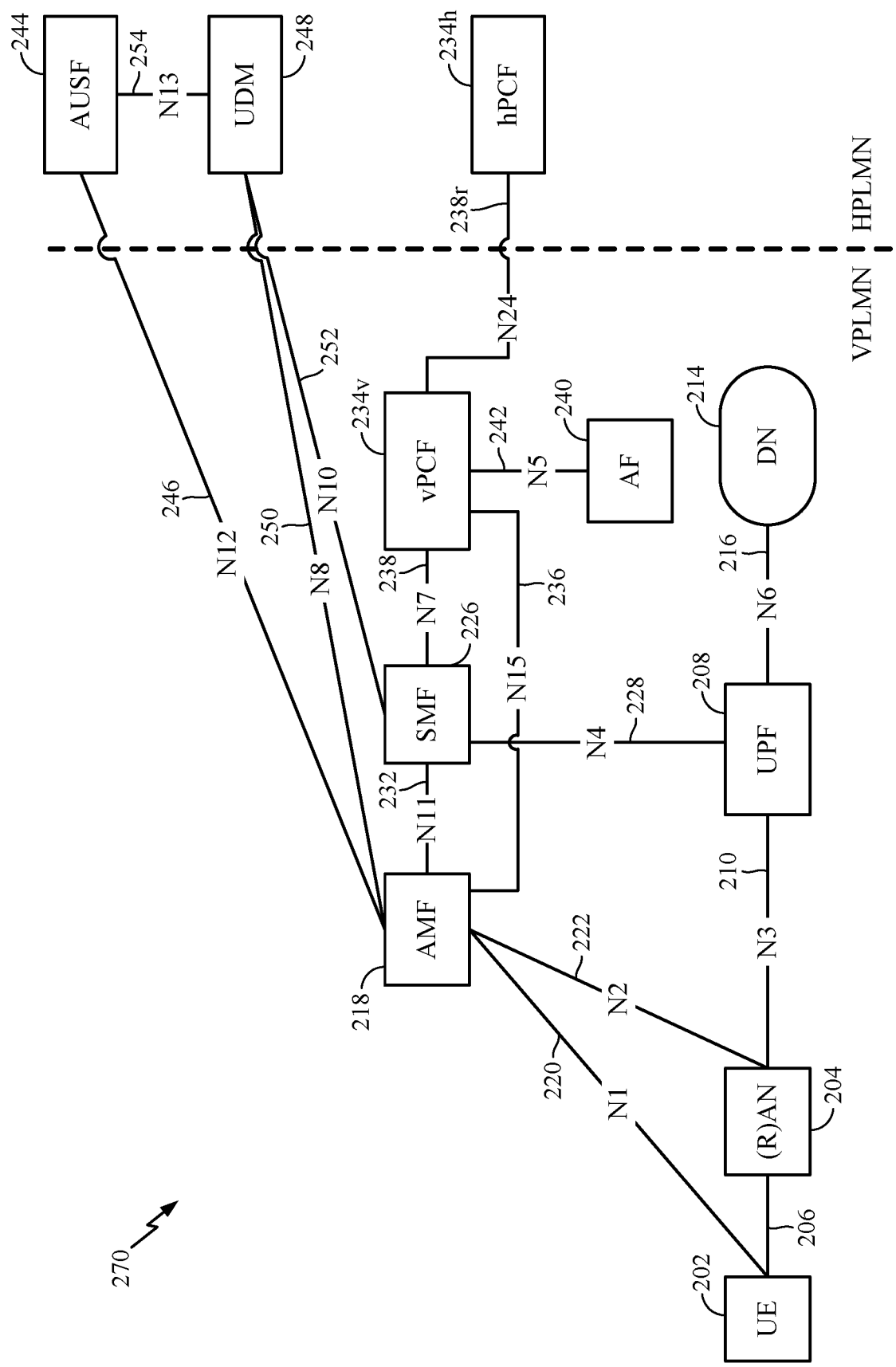

FIG. 2C illustrates an example logical architecture 270 of a NR RAN, which may be implemented in the wireless network 100 illustrated in FIG. 1. The logical architecture 270 is similar to the logical architecture 200 shown in FIG. 2A, with many of the same entities shown and labeled with the same labels. Thus, only differences from FIG. 2A will be described. In the logical architecture 270, the UE 202 is roaming, and is therefore connected with the home physical land mobile network (HPLMN) of the UE via certain entities in the visited physical land mobile network (VPLMN). In particular, the SMF communicates with the VPLMN PCF (vPCF) 234v, but some policy information regarding the UE's access to the DN may be retrieved from the HPLMN PCF (hPCF) 234h via a roaming N24 interface 238r. In FIG. 2C, the UE is able to access the DN via the VPLMN.

Figure 2D:
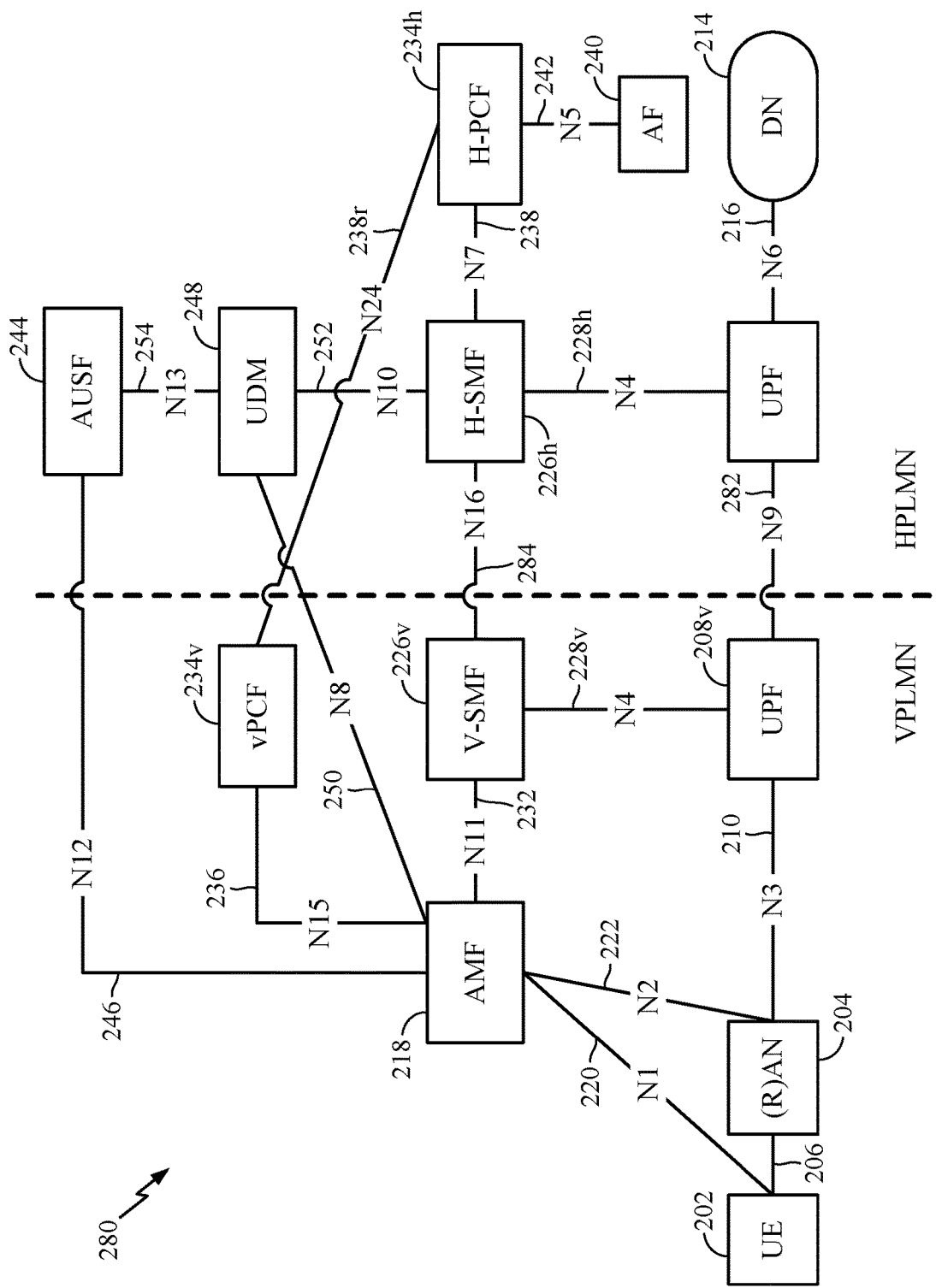

FIG. 2D illustrates an example logical architecture 280 of a NR RAN, which may be implemented in the wireless network 100 illustrated in FIG. 1. The logical architecture 280 is similar to the logical architecture 270 shown in FIG. 2C, with many of the same entities shown and labeled with the same labels. Thus, only differences from FIG. 2C will be described. In the logical architecture 280, the UE is roaming, and is therefore connected with the home physical land mobile network (HPLMN) of the UE via certain entities in the visited physical land mobile network (VPLMN). Unlike FIG. 2C, the UE in FIG. 2D is accessing a DN that the UE is not able to access via the VPLMN. Differences from FIG. 2C include that the UPF in the VPLMN communicates with the VPLMN SMF (V-SMF) 226v via an N4 interface 228v, while the UPF in the HPLMN communicates with the HPLMN SMF (H-SMF) 226h via an N4 interface 228h. The UPF of the VPLMN communicates with the UPF of the HPLMN via an N9 interface 282. Similarly, the V-SMF communicates with the H-SMF via an N16 interface 284.

Operations performed and protocols used by the various entities shown in the exemplary logical architectures 200, 250, 270, and 280 in FIGS. 2A-2D are described in more detail in documents "TS 23.501; System Architecture for the 5G System; Stage 2 (Release 15)" and "TS 23.502; Procedures for the 5G System; Stage 2 (Release 15)," both which are publicly available.

Figure 3:
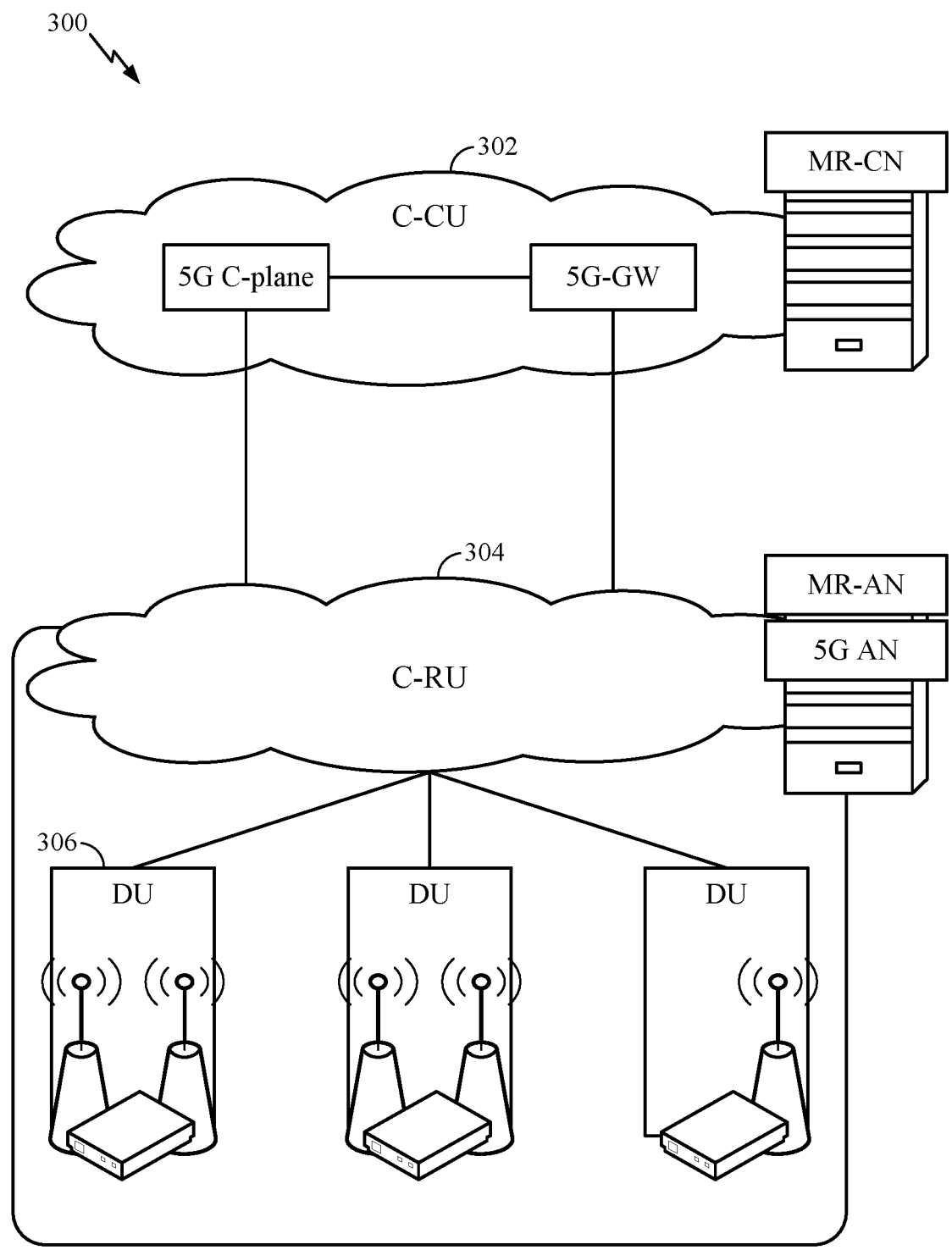
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
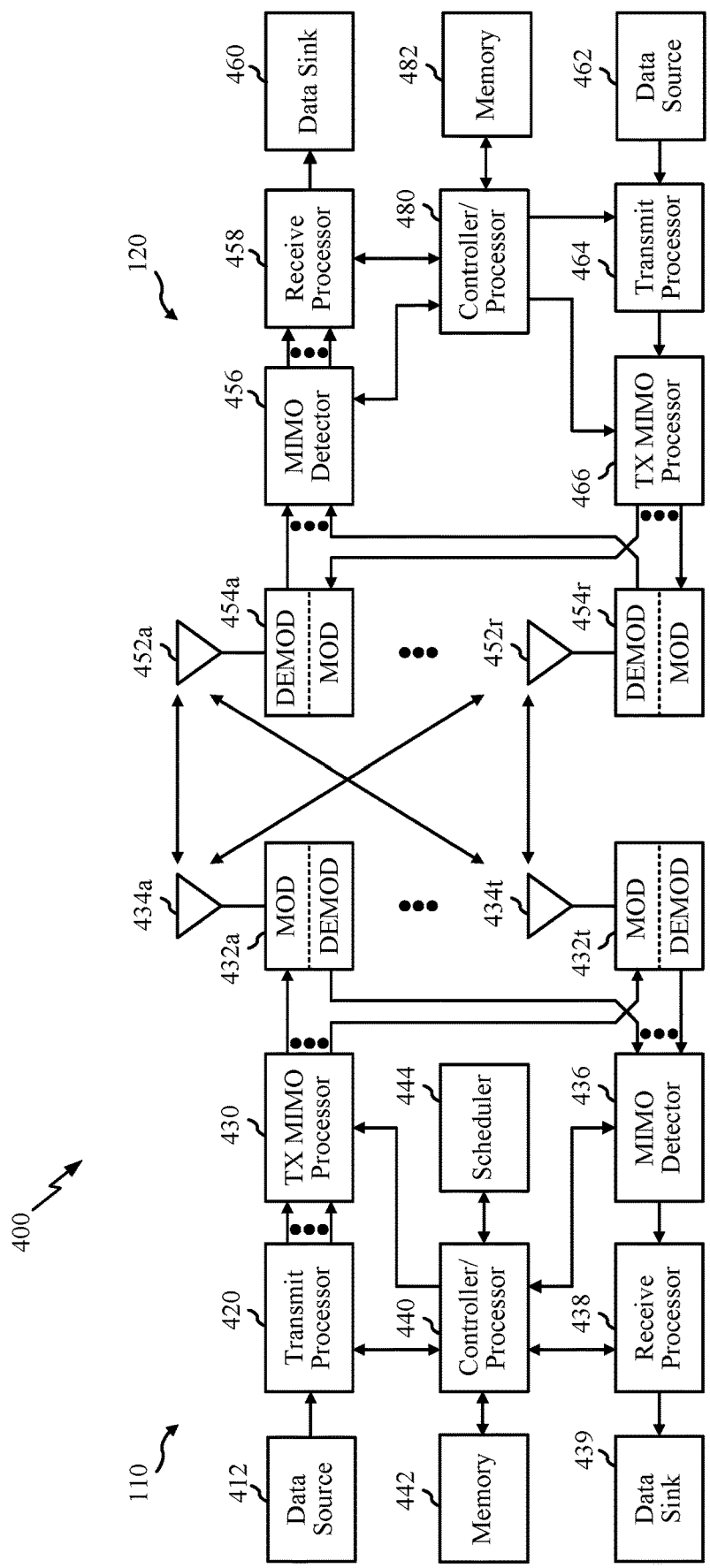
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the functional blocks illustrated in FIG. 8, and/or other processes for the techniques described herein. The processor 440 and/or other processors and modules at the BS 110 may also perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
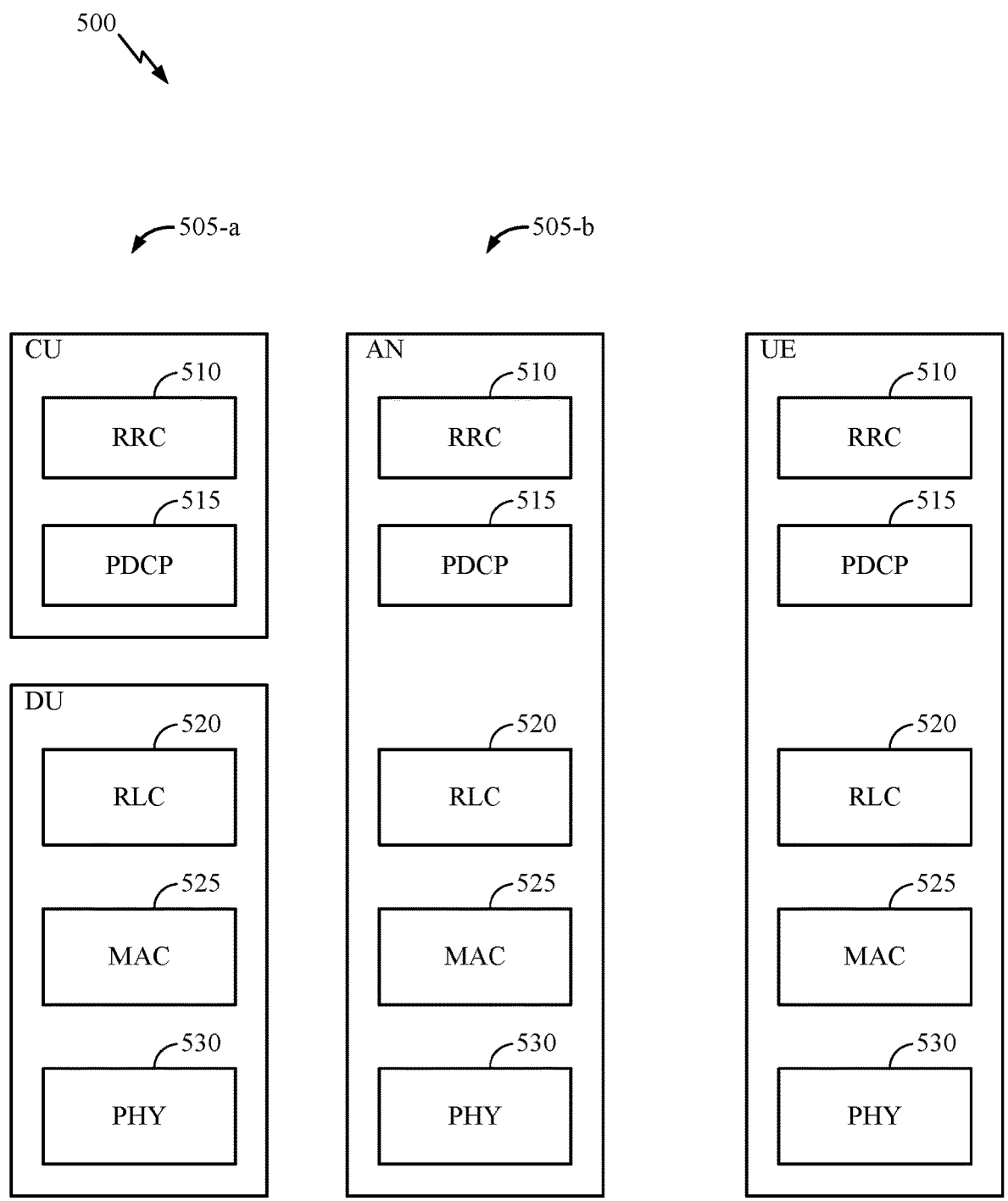
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
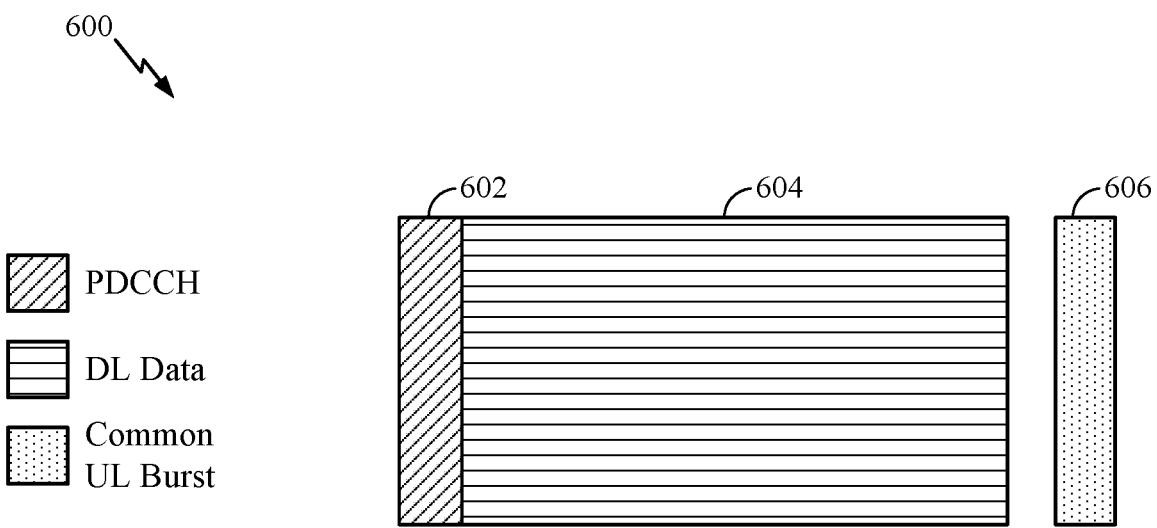
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
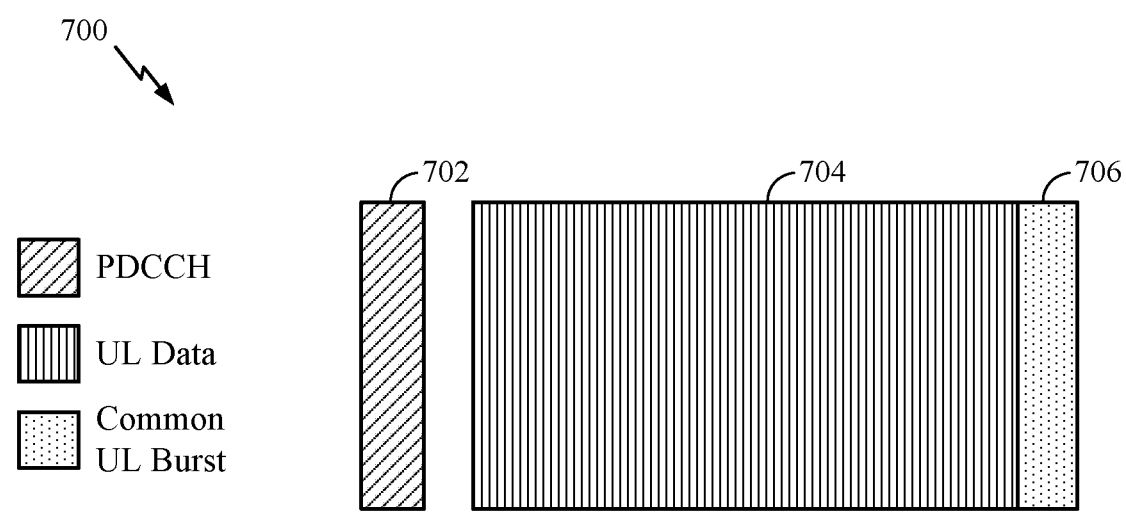
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Per-Flow Jumbo MTU in NR Systems

Maximum transmission unit (MTU) is largest supported transaction size. For example, the MTU may be largest packet size that can be transmitted/received in a network. If a transmission exceeds the MTU, then the transmission may be fragmented or dropped. Different networks and different devices may support different MTU sizes.

Internet Protocol version (IPv4) has a minimum MTU of 576 bytes. If an IPv4 router discovers a received IP packet exceeding the MTU size, it will fragment the IP packet before forwarding to the next hop (i.e., the next device in the reception path).

IPv6 has a minimum MTU of 1280 bytes. When an IPv6 router discovers a received IP packets exceeding the MTU size, it will drop the IP packet and send a message to the source indicating the packet exceed the MTU size (e.g., a "Packet Too Bit" message).

In IPv4 and IPv6, MTU discovery can be performed by initializing the MTU to the MTU of the first hop. A datagram can be sent with a bit set to "Don't Fragment". If an Internet Control Message Protocol message is received with the "Packet Too Big" indication, then the MTU size can be decreased.

In order to avoid IP layer fragmentation, for example, between the user equipment (UE) and the Gateway General Packet Radio Service (GPRS) Support Node (GGSN) or the Packet Gateway (P-GW), the link MTU size in the mobile station (e.g., the UE) can be set to the value provided by the network. In IPv4, the link MTU size is sent to the UE in a non-access stratum (NAS) Protocol Configuration Option (PCO) information element (e.g., which may be carried in the PDN Connectivity Request message, Activate Default EPS Context Request message, and/or Activate Default EPS Bearer Context Accept message). For example, a Container ID 0015H for non-IP link MTU request in the PCO can be used to configure a downlink MTU and an uplink MTU on a per-packet data network (PDN) basis. In IPv6 the link MTU size is sent to the UE in an IPv6 Router Advertisement message. The link MTU value can be provided during each PDN connection establishment.

In long term evolution (LTE), a typical MTU of around 1500 bytes may be supported. Certain systems, such as NR, may support larger size transport blocks (TBs), for example, 9000 bytes, which may use a larger MTU referred to herein as a "jumbo MTU" to increase throughput.

If the UEs set a large uplink MTU size large, then the UE can send out large packets, which may increase throughput; however, if the UL MTU size is too large, then the network cannot accept the large packets and the packets may be fragments or dropped, which may lead to packet loss. If the UE sets a too large downlink MTU size, then may allocate too many resources, such as memory size, for storing a very large packet; however, if the network does not support the large MTU size, then the UE will not receive such a large packet thereby wasting resources.

Certain systems, such as LTE, support a per-PDU MTU. However, different QoS (quality-of-service) flows (e.g., different bearers) within the PDN can have different MTU characteristics. Thus, it may be desirable to choose the MTU for per-flow, rather than per-PDU. Further, MTU discovery by the end nodes, such as by the UE and destination, may include a large amount of signaling overhead. Accordingly, techniques for per-flow MTU size are desirable.

Example Per-Flow MTU Size

Aspects of the present disclosure provide techniques and apparatus for MTU handling in NR. In some cases, while a default MTU size can be configured for the network (e.g., a per PDU session default MTU), the MTU size at the UE, for uplink or downlink, may be determined per-flow.

As discussed above with respect to FIGS. 2A-2D, in NR RAN, the logical architecture may include access and mobility management functions (AMFs), a session management function (SMF), and user plane function (UPF) that communicate with a data network (DN), UEs, gNB, and or/other functions that communicate via various interfaces. The communications can be associated with different MTU sizes.

Figure 8:
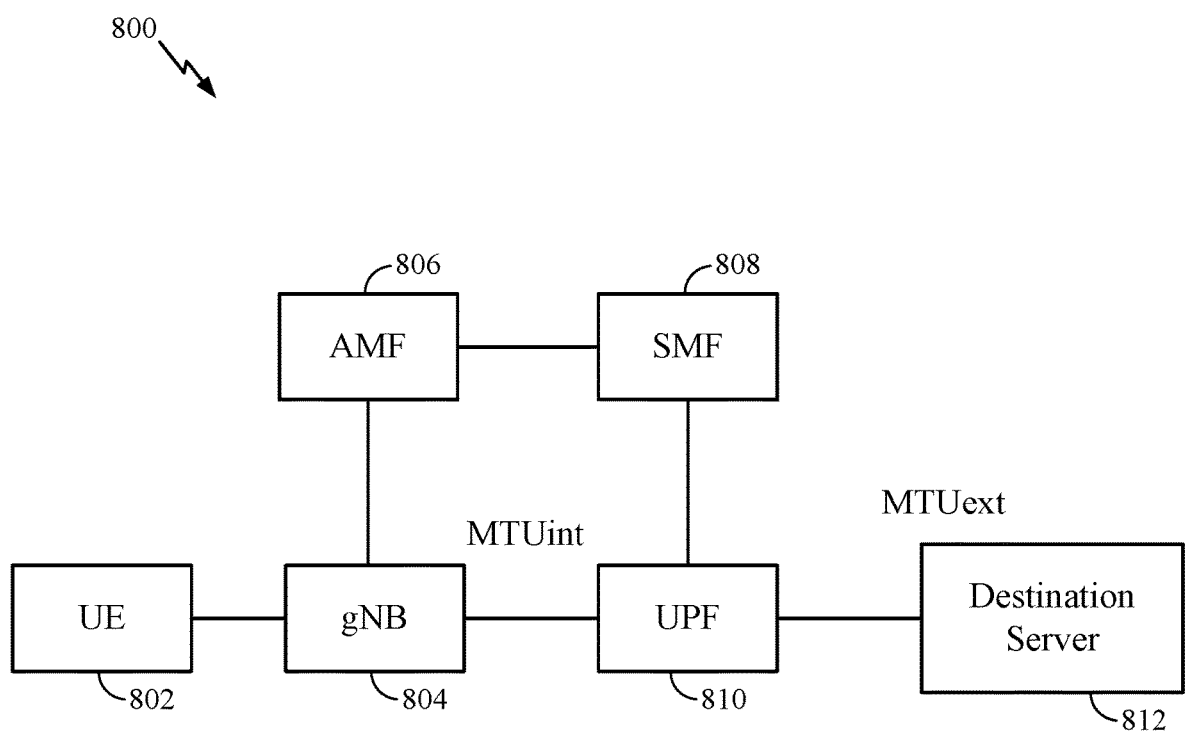
FIG. 8 is simplified block diagram of the logical architecture of a RAN, in accordance with certain aspects of the present disclosure.

FIG. 8 is simplified block diagram of the logical architecture 800 of the NR RAN including the gNB 804, AMF 806, SMF 808, and the UPF 810 in communication with the UE 802 and the destination server 812. The MTU supported within the logical architecture (e.g., by the gNB 804, AMF 806, SMF 808, and UPF 810) may be referred to as the public land mobile network (PLMN) MTU or internal MTU ($MTU_{int}$). The MTU size supported by the destination server 812 (e.g., associated with a destination IP address), such as an edge catching server or other destination server may be referred to as the external MTU ($MTU_{ext}$). Thus, the per-flow MTU size at can be based on a smallest MTU size supported within the network ($MTU_{int}$) and by a destination device ($MTU_{ext}$) for the flow. In some cases, a network entity can act as a proxy for the UE for MTU discovery to determine the uplink and/or downlink MTU size associated with the destination device.

Figure 9:
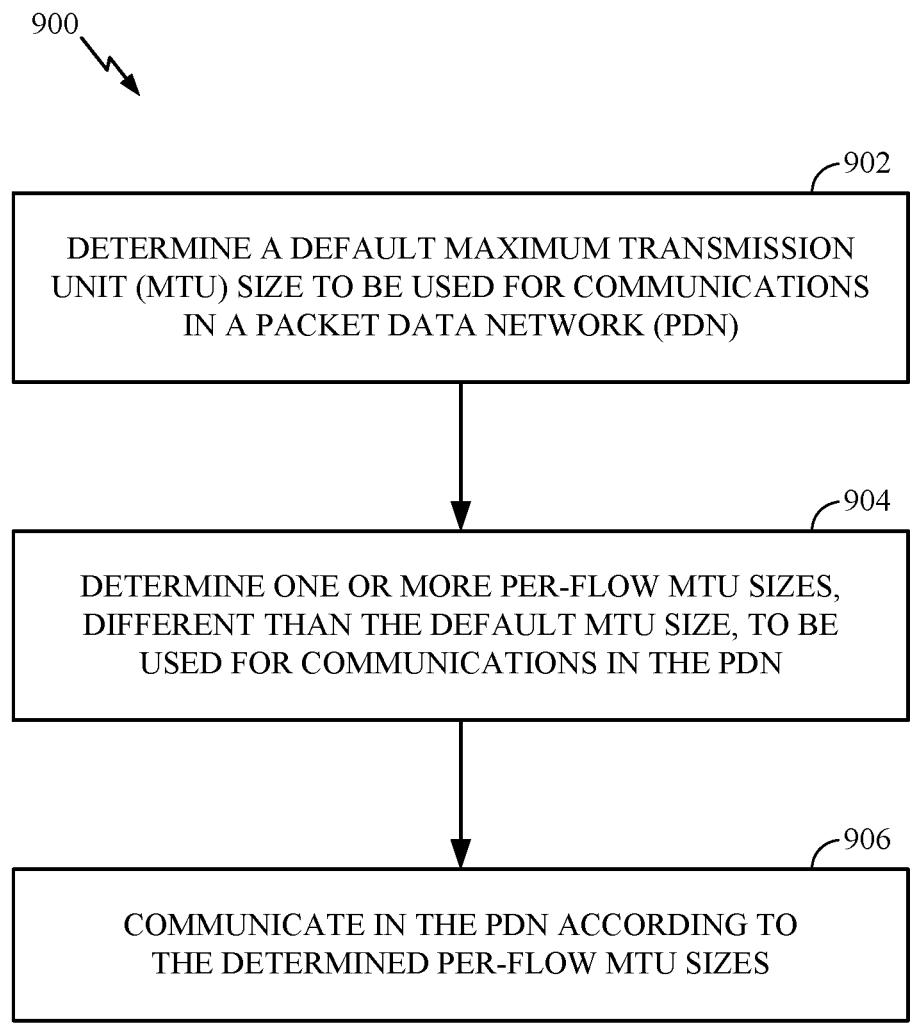
FIG. 9 is a flow diagram illustrating example operations that may be performed by a UE for determining a maximum transmit unit (MTU) size for communications, in accordance with certain aspects of the present disclosure.

FIG. 9 is a flow diagram illustrating example operations 900 for wireless communications, in accordance with certain aspects of the present disclosure. The operations 900 may be performed by a UE (e.g., such as one of the UEs 120 illustrated in FIG. 1).

The operations 900 may begin, at 902, by determining a default MTU size to be used for communications in a PDN. The default MTU size may be received during establishment of a PDN connection or a PDU session.

At 904, the UE determines one or more per-flow MTU sizes, different than the default MTU size, to be used for communications in the PDN. The per-flow MTU may be a jumbo MTU (e.g., greater than 1500 bytes). The determination of the per-flow MTU size may be reflective (e.g., based on a size of a packet received from a device associated with the flow), based on signaling from the BS, and/or based on signaling from a network entity. The signaled MTU may be based on proxy MTU discovery by a network entity with a destination device associated with the flow. The indicated MTU may correspond to a smallest MTU size supported in the transmission/reception path.

At 906, the UE communicates in the PDN according to the determined per-flow MTU sizes.

Example Reflective MTU Size

According to certain aspects, the UE may determine the uplink MTU size (and/or the downlink MTU size) for a flow based on a received packet size. For example, if the UE receives a downlink packet that has a larger size than the currently MTU size (e.g., the default), then the UE may increase the MTU size to a higher value. In some example, even if the UE receives a downlink packet that is smaller than the currently set MTU size, the UE may maintain the currently set MTU size (e.g., not decrease it).

Example Network Proxy to Check Edge MTU Size

According to certain aspects, the network (e.g., the next generation core (NGC), can act as a proxy for MTU discovery for a flow and inform the UE of the MTU size.

Figure 10:
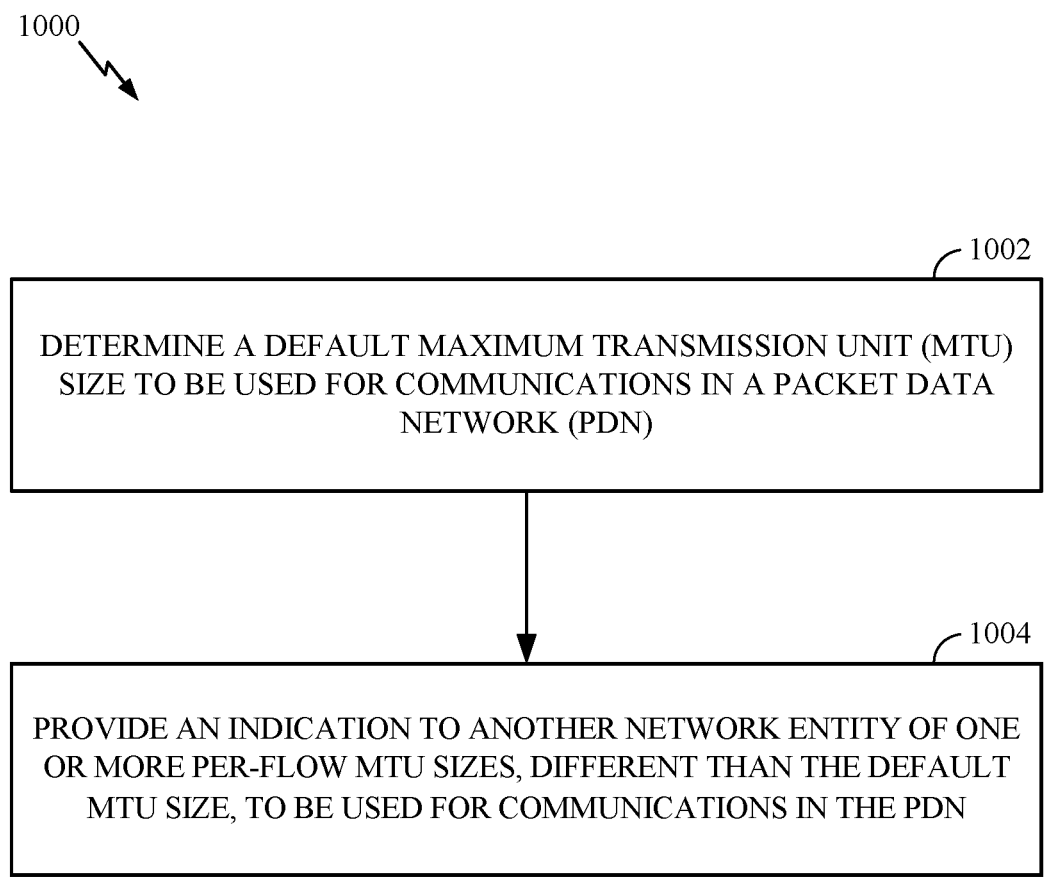
FIG. 10 is a flow diagram illustrating example operations that may be performed by a network function for determining MTU size, in accordance with certain aspects of the present disclosure.

FIG. 10 is a flow diagram illustrating example operations 1000 for determining a per-flow MTU size, in accordance with certain aspects of the present disclosure. The operations 1000 may be performed by a network function (e.g., such as the UPF 810 illustrated in FIG. 8). The operations 1000 may begin, at 1002, by determining a default MTU size to be used for communications in a PDN.

At 1004, the network function provides an indication to another network function (e.g., the SMF) of one or more per-flow MTU sizes, different than the default MTU size, to be used for communications in the PDN.

In some examples, the network can detect the MTU size for an edge caching server. Caching content at network edges may allow for reduced latency in provisioning content to a plurality of UEs requesting the same content. Caching content generally allows for reduced latency in delivery of content. Reductions in latency may be useful in a variety of scenarios, such as industrial automation, delivery of content in real-time applications (e.g., online video games), to provide for increased TCP throughput, and so on. Caching at a network edge may reduce an amount of backhaul transmissions and reduce processing delays in provisioning the same content to a plurality of UEs. Requested data may be served, thus, from a device on the network edge rather than from a remote source, which may reduce the amount of traffic on a core network.

The UPF may detect the edge caching server. The UPF can detect the flow provided by the edge caching server and the MTU size used for the edge caching server (MTUext). Thus, the network can signal the MTU size to be used for the UL and/or DL downlink MTU size or the network or the network can signal the MTUint and the detected MTUext of the edge caching server to the UE and the UE can determine the uplink and downlink MTU size based on the indicated MTU values. In some examples, the MTU size is set to the smaller of the MTUint and MTUext (i.e., min{MTUint, MTUext}).

Figure 11:
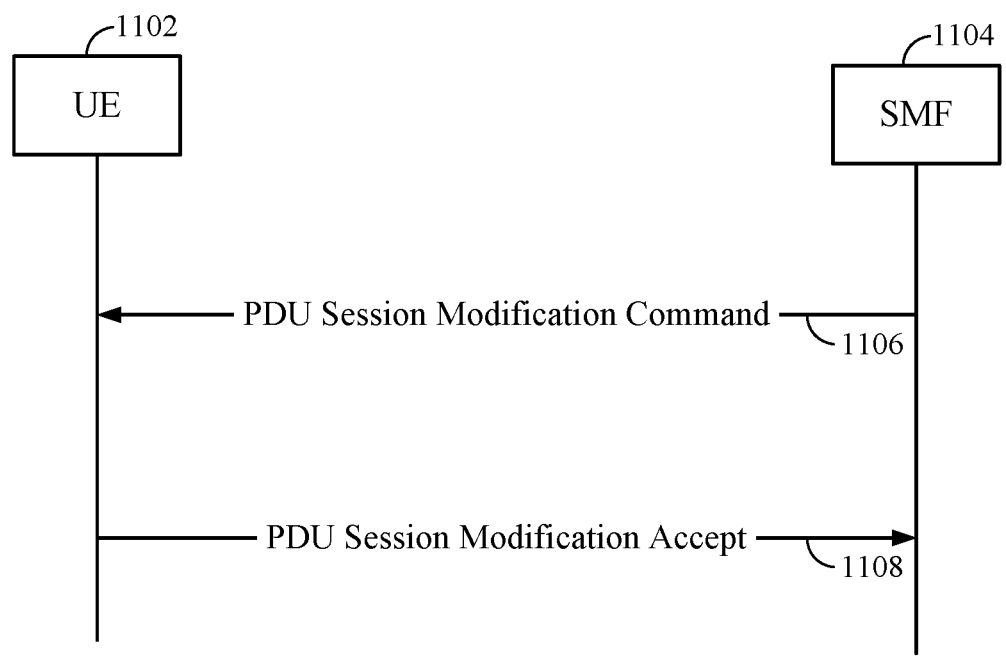
FIG. 11 is a call flow for explicit non-access stratum (NAS) signaling of MTU size, in accordance with certain aspects of the present disclosure.

In some examples, the MTU size is signaled by the SMF to the UE. The SMF may use explicit network signaling. For example, the SMF may signal the MTU size to the UE in a PCO message. As shown in FIG. 11, the SMF 1104 signals the MTU size to the UE 1102 in a PDU Session Modification Command message 1106 and the UE 1102 responds to the SMF 1104 with the PDU Session Modification Accept message 1108. The UE 1102 can set the DL and/or UL MTU size for the flow based on the signaling.

Figure 12:
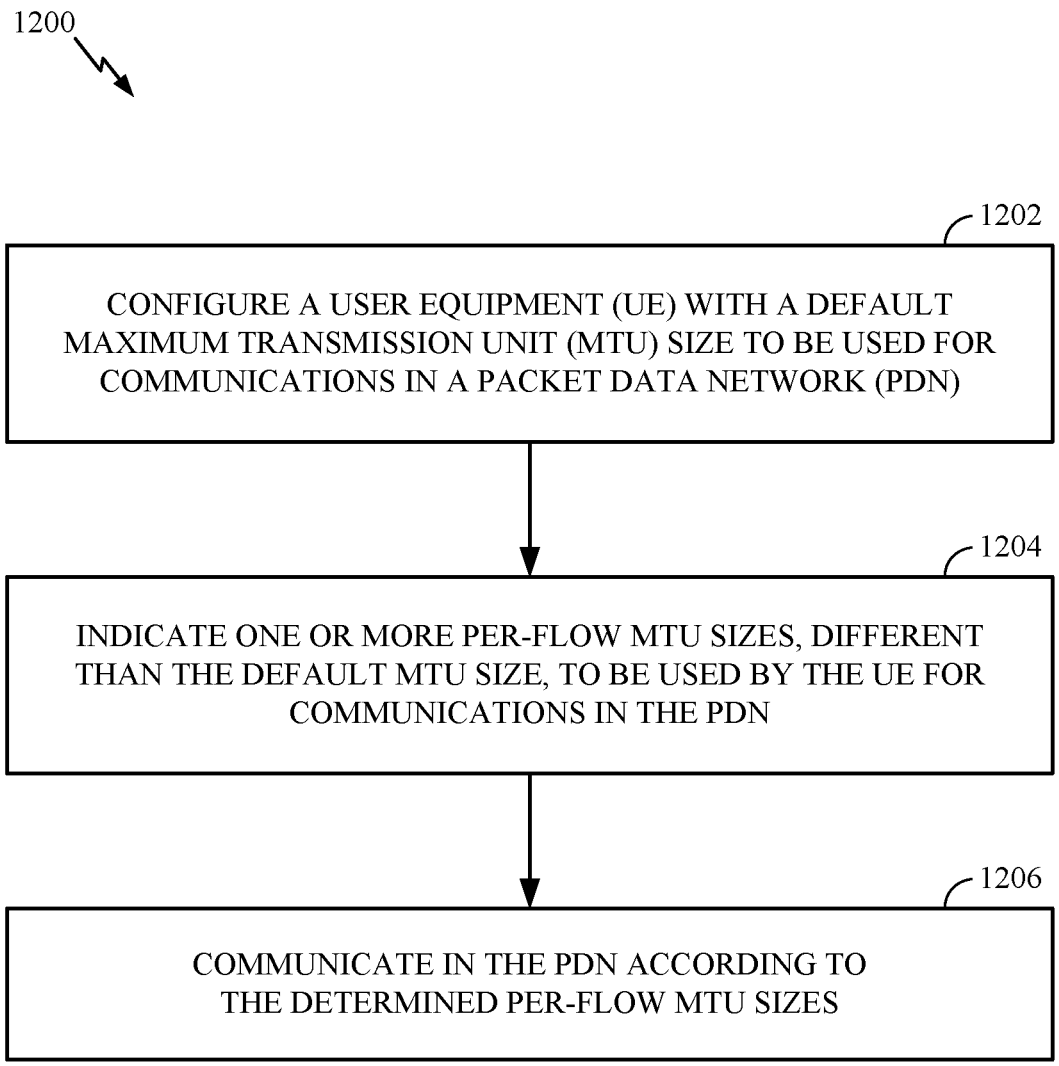
FIG. 12 is a flow diagram illustrating example operations that may be performed by a BS for determining MTU size, in accordance with certain aspects of the present disclosure.

In some examples, the MTU size is signaled by the gNB to the UE. FIG. 12 is a flow diagram illustrating example operations 1200 for determining a per-flow MTU size, in accordance with certain aspects of the present disclosure. The operations 1200 may be performed by a BS (e.g., such as the BS 110 illustrated in FIG. 1). The operations 1200 may begin, at 1202, by configuring (e.g., during establishment of a PDN connection or a PDU session) a UE with a default MTU size to be used for communications in a PDN.

At 1204, the BS indicates (e.g., via AS signaling in a SDAP header) one or more per-flow MTU sizes, different than the default MTU size, to be used by the UE for communications in the PDN. The BS may receive an indication of the one or more per-flow MTU sizes from a network entity (e.g., from the AMF) in the PDN via explicit network signaling. At 1206, the BS communicates in the PDN according to the determined per-flow MTU sizes.

Figure 13:
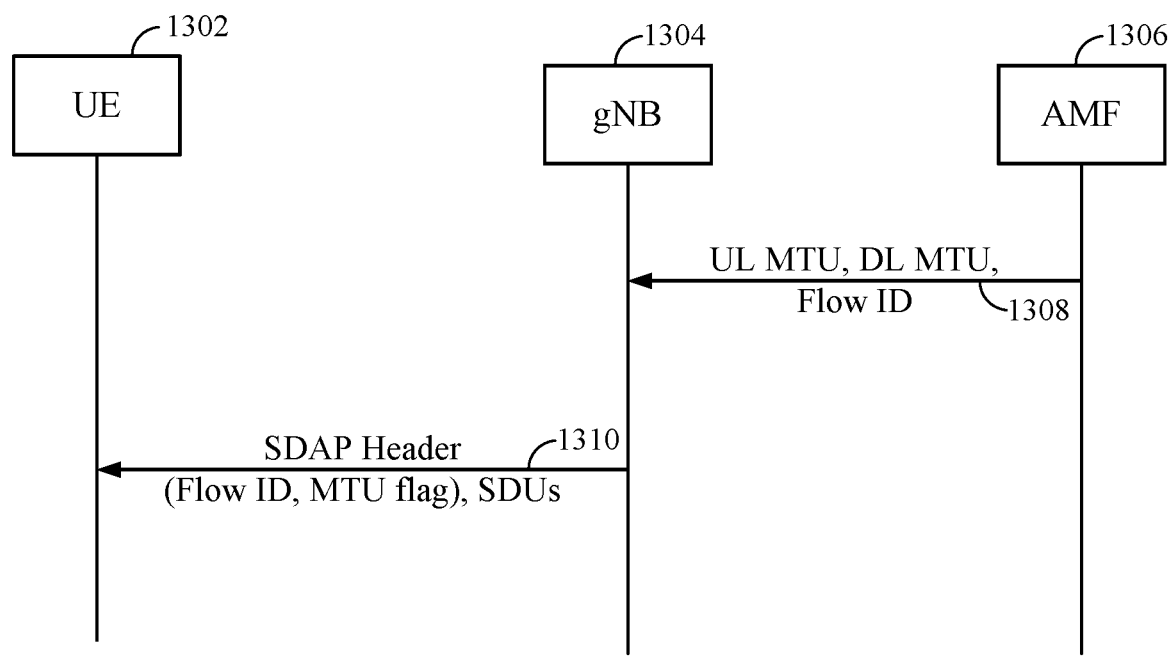
FIG. 13 is a call flow for AS signaling of MTU size, in accordance with certain aspects of the present disclosure.

As shown in FIG. 13, the gNB 1304 can receive an indication of the per-flow MTU sizes from the AMF 1306. For example, the AMF 1306 can signal the gNB 1304 using explicit NAS signaling. The AMF 1306 may signal the uplink MTU, downlink MTU, and the flow ID to the gNB 1304. The gNB 1304 can forward the MTU sizes to the UE 1302, for example, in AS signaling. The gNB 1304 may set the Service Data Adaption Protocol (SDAP) header. The gNB 1304 may include the flow ID of the flow for change in the SDAP header with a one or two bits flag field to imply MTU size used. For example, if one bit of a flag is used and set="1", 9000 bytes MTU is used for both DL and UL.

Figure 14:
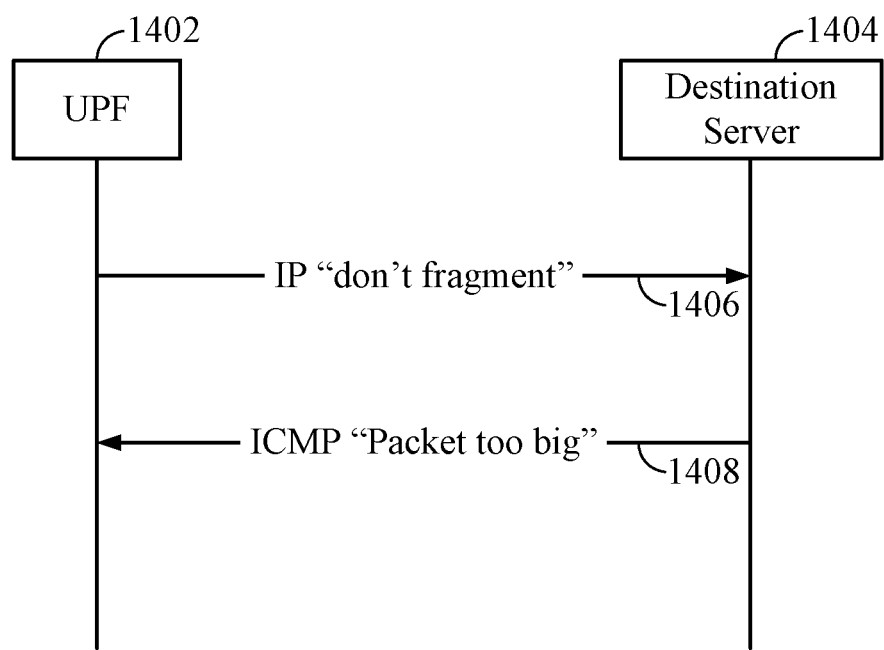
FIG. 14 is a call flow for network proxy MTU size discovery, in accordance with certain aspects of the present disclosure.

According to certain aspects, the core network can act as a proxy to probe for uplink MTU discovery. The network may know the MTUin. The UPF may discover the largest MTU size for a flow to a destination server (e.g., associated with a destination IP address). As shown in FIG. 14, the UPF 1402 can send out some datagram 1406 (e.g., a ping) to the destination server 1404. The datagram may be an IP packet with an indication set to "do not fragment". The destination server 1404 may respond, for example, with an ICMP indicating "packet too big" 1408. To avoid too frequent probes, the UPF 1402 may only send a jumbo size datagram. If the jumbo size datagram fails, then the default MTU may be used. If the UPF 1402 discovers the MTU size for the destination server 1404 (the MTUext), the UPF 1402 may set the UL MTU size as the minimum of the MTUint and MTUext. The signaling to the UE may be from the SMF or the gNB.

Figure 15:
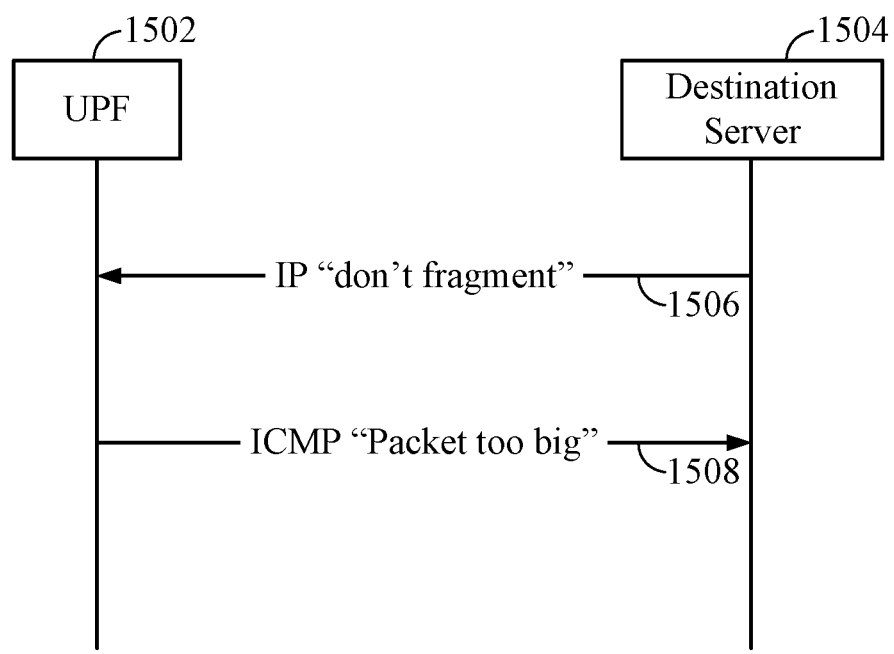
FIG. 15 is a call flow for network proxy MTU size discovery, in accordance with certain aspects of the present disclosure.

According to certain aspects, the core network can act as a proxy for downlink MTU discovery and responding to the destination server. The UPF may discover the largest MTU size for a flow from a destination server (e.g., associated with a destination IP address). As shown in FIG. 15, the UPF 1502 can receive some datagram 1506 (e.g., a ping) from the destination server 1504. The datagram may be an IP packet with an indication set to "do not fragment". The UPF 1502 may respond, for example, with an ICMP indicating "packet too big" 1508. If the downlink ICMP packet size is too large, it cannot be handled by the PLMN internal network or the UEs. The NGC can learn from the DL IP packet size used from the QoS flow that comes from the server with IP address. The signaling to the UE may be from the SMF or the gNB.

Example MTU Size Based on Signal Quality

According to certain aspects, the MTU size can be determined based on signal quality. For example, if the signal quality is poor, it may be preferable to use smaller MTU size; and if the signal quality is good, it may be preferable to use a larger MTU size. With the measured signal quality, the UE can update the MTU size used in UL transmission.

Example MTU Size Based on RAT

The UE may be configured with some 4G data radio bearers (DRBs) using LTE and some 5G DRBs using NR in dual connectivity. The determination of the MTU size may be based on the RAT associated with the flow. For example, if a flow is on a DRB via 5G (secondary cell group (SCG) bearer, master cell group (MCG) split bearer, or SCG split bearer), then it may use larger MTU than that a flow via 4G (MCG bearer).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray ED disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a default maximum transmission unit (MTU) size to be used for communications in a packet data network (PDN);
   determining based on an indication from a network function in the PDN, one or more per-flow MTU sizes, different than the default MTU size, to be used for communications in the PDN, wherein the indication comprises an indication of a smaller of the default MTU size, an MTU size supported by the network functions in the PDN, and an MTU size supported by a destination server; and
   communicating in the PDN according to the determined per-flow MTU sizes.

2. The method of claim 1, wherein the default MTU size is received during establishment of a PDN connection or a protocol data unit (PDU) session.

3. The method of claim 1, wherein at least one of the one or more per-flow MTU sizes is greater than 1500 bytes.

4. The method of claim 1, wherein the determination of the one or more per-flow MTU sizes is based on a size of a packet received from a device associated with the flow.

5. The method of claim 1, wherein the determination comprises:
   determining an uplink MTU size for a flow that is larger than the default MTU size if the received packet is larger than the default MTU size.

6. The method of claim 1, wherein the network function is a session management function (SMF).

7. The method of claim 6, wherein the indication is provided in a non-access stratum (NAS) signaling PDU session modification command.

8. The method of claim 1, wherein the indication is from a base station (BS).

9. The method of claim 8, wherein the indication is provided in an access stratum (AS) signaling message.

10. The method of claim 1, wherein the determination of the one or more per-flow MTU sizes is based on a signal quality measurement.

11. The method of claim 1, wherein the determination of the one or more per-flow MTU sizes is based on a radio access technology (RAT) associated with a dedicated radio bearer (DRB) used for the flow.

12. A method for wireless communications by a base station (BS), comprising:
   configuring a user equipment (UE) with a default maximum transmission unit (MTU) size to be used for communications in a packet data network (PDN);
   indicating one or more per-flow MTU sizes, different than the default MTU size, to be used by the UE for communications in the PDN;
   receiving an indication of the one or more per-flow MTU sizes from a network function in the PDN via explicit network signaling, wherein the indication comprises an indication of a smaller of the default MTU size, an MTU size supported by the network functions in the PDN, and an MTU size supported by a destination server; and communicating in the PDN according to the indicated per-flow MTU sizes.

13. The method of claim 12, wherein the default MTU size is configured during establishment of a PDN connection or a protocol data unit (PDU) session with the UE.

14. The method of claim 12, wherein at least one of the one or more per-flow MTU sizes is greater than 1500 bytes.

15. The method of claim 12, wherein the network entity is an access and mobility management function (AMF).

16. The method of claim 12, wherein the indication is provided via access stratum (AS) signaling.

17. A method for wireless communications by a network function, comprising:
   determining a default maximum transmission unit (MTU) size to be used for communications in a packet data network (PDN);
   detecting an MTU size supported by a destination server associated with the flow, wherein the indication comprises an indication of a smaller of the default MTU size, an MTU size supported by the network functions in the PDN, and the MTU size supported by the destination server; and
   providing an indication to another network function of one or more per-flow MTU sizes, different than the default MTU size, to be used for communications in the PDN.

18. The method of claim 17, wherein at least one of the one or more per-flow MTU sizes is greater than 1500 bytes.

19. The method of claim 17, wherein the network function is a user plane function (UPF).

20. The method of claim 17, wherein the other network function is a session management function (SMF).

21. The method of claim 17, wherein the destination server comprises an edge caching server.

22. The method of claim 17, wherein detecting the MTU size supported by the destination server comprises:
   pinging the destination server to discover the MTU size supported by the destination server.

23. The method of claim 17, wherein pinging the destination server comprises:
   sending the destination server a packet larger than the default MTU size; and
   determining if the destination server successfully receives the packet.

24. The method of claim 17, wherein detecting the MTU size supported by the destination server comprises:
   receiving a packet from the destination server; and
   determining the MTU size supported by the destination server based on a size of the received packet.

25. The method of claim 17, further comprising:
   receiving a packet from the destination server; and
   indicating to the destination server that the packet size is not supported if the size of the packet is larger than the per-flow MTU size associated with the flow.

* * * * *